Patented Aug. 3, 1937

2,088,913

UNITED STATES PATENT OFFICE 2,088,913

PREPARATION OF TITANIUM AND IRON COMPOUNDS

William Basil Llewellyn, Manchester, England, assignor to Peter Spence & Sons, Limited, Manchester, England No Drawing. Application January 18, 1934, Serial No. 707,178. In Great Britain January 18, 1933

4 Claims. (Cl. 75—114)

Methods of opening-up titaniferous-iron minerals, e. g., ilmenite, by treatment with sulphuric acid whereby both the titanium and the iron are converted to sulphates which, if not yielded directly as a solution, are readily dissolved on adding water, are well known, and such sulphate solutions may suitably serve as sources of other titanium compounds. It has not hitherto been known, however, that the titanium contained in such minerals could be dissolved directly in hydrochloric acid; on the contrary, it has been published that naturally occurring forms of titanic oxide are practically insoluble in hydrochloric acid (see British Patent No. 108,693, page 1, lines 26–28) and proposals have, therefore, been made to obtain titanium chloride solutions by double decomposition between titanium sulphate and alkaline-earth chloride.

Now I have found that if a titaniferous-iron ore such as ilmenite be treated with hydrochloric acid of, e. g., the usual commercial concentration at comparatively low temperatures, e. g., in the neighbourhood of about 50–60° C. and lower, the great bulk of the titanium may gradually be obtained in solution concurrently with the iron, provided other conditions (particularly with respect to the strength and acidity of the solution) are suitable. I have further found that if the treatment with hydrochloric acid solutions be carried out at elevated temperatures, e. g., in the neighbourhood of, or somewhat below, the boiling point of commercial hydrochloric acid e. g., about 90°–100° C., analysis of the solution even after several days shows that, while it contains much iron, it contains little or no titanium. However, in the earlier stages of the treatment at 90–100° C. considerable titanic acid is sometimes present in solution, and it is precipitated by maintaining such high temperatures. In this way, particularly if the mineral be finely ground, I am able (with or without the presence of reducing agents to maintain the iron in or convert it to the ferrous state) to obtain nearly all the iron in solution and a very high proportion of the titanium as titanic acid with relatively little iron impurity, and my invention consists in the treatment of titaniferous-iron minerals with aqueous solutions of hydrochloric acid under such control conditions that, as may be desired, the iron and titanium are together brought into and maintained in solution, or the iron is obtained in solution while the titanic acid is separated in a largely purified form.

The temperatures below which re-precipitation of titanium does not take place will vary somewhat according to the concentration of free acid in the solutions, the maximum permissible temperature becoming lower as the acidity is lessened. Up to such precipitation point raising the temperature assists to dissolve the titanium and iron. To obtain a high percentage extraction of the titanium and iron from the mineral, a considerable excess of hydrochloric acid beyond theoretical requirements is an assistance in the final stages of treatment of the mineral, and so is a high concentration of free acid. Thus, acid of 1.150 sp. gr. reacts much more speedily than does acid of 1.110 sp. gr. and it also resists better any tendency for the titanic acid to re-precipitate. To neutralize the hydrochloric acid as far as possible, it is desirable to have present a considerable excess of the mineral in the later stages of the neutralization. For the foregoing reasons I may suitably operate on the contra current system in a series of vessels, introducing the fresh acid to the most exhausted mineral, afterwards passing it to progressively less exhausted mineral in the other vessels, and treating fresh mineral with the least acid (i. e., the most nearly neutralized) solution and thereafter with progressively more acid solutions, for such times as will provide a largely neutralized solution of titanium and iron chlorides and at the same time give a high percentage utilization of the mineral; or I may operate in a single vessel with a considerable excess of mineral until the hydrochloric acid is sufficiently neutralized, separate the solution of titanium and iron chlorides, e. g., by settlement or filtration, digest the mineral a second time with a further quantity of aqueous hydrochloric acid and when this has been partially neutralized add more mineral equivalent to that dissolved in the first digestion, separate this second solution similarly when sufficiently neutralized, add a third quantity of acid and continue the process on these lines. When it is desired to obtain the maximum degree of neutralization of the titanium and iron chloride solutions, without re-precipitation of $TiO_2$, it is advisable carefully to regulate the temperatures of the solutions, the highest temperatures being employed with the most acid solutions, and progressively lower temperatures, or even the atmospheric temperature, being employed with the solutions as they become more fully neutralized.

In operating under higher temperature conditions in order to obtain separation of the titanic acid from the iron during the process of decomposing the mineral I may, (when using the contra current system) operate substantially as in the case of obtaining titanium and iron oxides in solution, except that I employ temperatures above those which the titanium may be retained in solution and preferably at those approximating to the boiling points of the solutions or as much below as may be most convenient. At such elevated temperatures the rates of dissolution of the mineral and of separation of the titanic acid from the solution are increased.

When employing a single vessel under said higher temperature conditions, I prefer to have present an excess of acid in order that but little of the mineral may be undecomposed; or the mineral may be successively digested with two or more charges of acid, the first of which may suitably consist of acid partly neutralized in previous operations, and whose neutralization may now be carried to the required extent on the fresh mineral.

I may employ the mineral in a finely divided form, and I then prefer to agitate the mixture to prevent local excessive neutralization which (when the titanium is desired in solution) might result in some re-precipitation. I may also employ the mineral in the form of small grains or pieces, suitably lying on a perforated or permeable false bottom so as to permit of the acid solution percolating constantly through the body of the mineral. I may pass HCl gas into the solution to maintain or increase the concentration as desired, and I may also carry out the operations under pressure in closed vessels with the same purpose, and to avoid loss.

To assist the solution of the iron and also to improve the quality of separated titanic acid, I may have some titanous salt present to reduce the iron to the ferrous state. When the iron content of the solution is high, e. g., over 100 grams per litre expressed as $Fe_2O_3$ and especially if it is mainly in the ferrous state, I find I am able to crystallize out a proportion of the iron chloride by cooling, and for this purpose I may cool such solution e. g., to the ordinary atmospheric temperature or considerably below it by known artificial means. In this way I am able to obtain a chloride solution with a higher ratio of titanium to iron than I otherwise should. I may also add hydrochloric acid, suitably in the gaseous form, to assist the salting or crystallizing out of the iron chloride.

I may also have present in the hydrochloric acid digesting solutions, minor proportions of other acids, e. g., hydrofluoric acid, or sulphuric acid. The presence of a small proportion of sulphuric acid tends to delay the precipitation of $TiO_2$ from the solution, and also to slow down the reaction between acid and mineral. The precipitated titanic acid also then contains a little sulphuric acid combined with it, which may be an advantage in some cases.

The titanium and iron chloride solutions obtained by the process may, after separation of insoluble matter, be treated by known or suitable means for the preparation therefrom of other titanium and iron compounds and the titanic acid separated during the process of dissolution of the mineral at higher temperatures may also be treated by known or suitable means, e. g., by hot, strong sulphuric acid, for the preparation of other titanium compounds therefrom or of titanic acid in purer form. In some cases the titanium and iron chloride solutions obtained by the process may, after separation of insoluble matter, be heated to temperatures sufficiently high to precipitate the titanic acid and leave the iron in solution, which latter may then be separated from the precipitated titanic acid.

The following are examples of how the invention may be carried into practical effect:—

Example 1.—Ground ilmenite containing about 50% $TiO_2$ and 46% $Fe_2O_3$ is slowly stirred, in a suitable vessel, with aqueous hydrochloric acid of about 1.150 sp. gr. chemically equivalent to e. g. from one-half to one-fourth of the titanium and iron contained by the mineral, starting at a temperature of about 50–60° C. and gradually lowering it to about 35° C. as neutralization proceeds. After, e. g., two or three days, the solution may contain about 80–100 grams $TiO_2$ and iron (mostly in the ferrous state) equivalent to 100–120 grams $Fe_2O_3$ per litre, and be sufficiently neutralized for the purpose in view. It is then settled, the supernatent solution syphoned off and further clarified, if necessary, a further quantity of the solution may be removed by filtration if desired, a second charge of aqueous hydrochloric acid is added, the temperature raised again to 50–60° C. and when the rate of neutralization becomes slow more ground mineral (equivalent to that dissolved in the first operation) is added, and digestion and separation carried out a second time as before. Successive charges of acid and mineral may be digested in this manner, after each of which the sufficiently neutralized solution of titanium and iron chlorides is removed as indicated. If matter insoluble in hydrochloric acid accumulates too greatly it may, of course, be removed (preferably after digestion with sufficient acid to dissolve most of its soluble constituents) and fresh mineral substituted.

Example 2.—Ground ilmenite (which may have had a preliminary extraction by partly neutralized acid from previous operations) is stirred with aqueous hydrochloric acid of, e. g., 1.150 sp. gr. in distinct excess of what is required to combine with its iron content, and heated to, e. g., 85–95° C. for, e. g., 1 or 2 days, or until tests show that no more iron is being extracted. The solution will then consist of ferrous and ferric chlorides with little or no $TiO_2$ in solution and free hydrochloric acid, and is allowed to settle (which it does readily) and is syphoned off. The residue may be subjected to any known and suitable method of separating materials which settle at different speeds in order to remove undecomposed mineral from the purified titanic acid. The residue is washed, e. g., on a suitable filter, either with aqueous hydrochloric acid or with water, and may be further treated by, e. g., boiling with strong sulphuric acid to give a relatively pure solution of titanic sulphate. If the hydrochloric acid solution is still considerably acid it and its washes may be utilized in the aforesaid preliminary extraction of later charges of ilmenite.

Example 3.—The titanium and iron chloride solution obtained in Example 1 is, after separation from the insoluble matter, heated to, e. g., 85–90° C. to precipitate the titanic acid and leave the iron in solution which latter is then separated from the precipitated titanic acid.

What I claim as my invention and desire to secure by Letters Patent is:—

1. The process for decomposing titaniferous minerals such as ilmenite which process comprises treating such materials with an aqueous solution of hydrochloric acid at a temperature between 50 and 60 degrees C., gradually lowering the temperature to approximately 35 degrees C., separating the titanium and iron chloride solution from the insoluble matter, and heating the solution to a temperature between 85 and 90 degrees C., to precipitate the titanic acid.

2. The process for obtaining readily separable titanium and iron compounds in solution from titaniferous minerals such as ilmenite, which process comprises treating such material with hydrochloric acid at a temperature between 50 and 60 degrees C., and gradually lowering the temperature as neutralization proceeds.

3. The process for obtaining readily separable titanium and iron compounds in solution from titaniferous minerals such as ilmenite, which process comprises treating such material with hydrochloric acid at a temperature between 50 and 60 degrees C., and gradually lowering the temperature to approximately 35 degrees C.

4. The process for obtaining readily separable titanium and iron compounds in solution from titaniferous minerals such as ilmenite, which process comprises treating such material with hydrochloric acid of a specific gravity of 1.150 and at a temperature between 50 and 60 degrees C., and gradually lowering the temperature to approximately 35 degrees C.

WILLIAM BASIL LLEWELLYN.